United States Patent
Schmüdderich et al.

(10) Patent No.: US 9,878,710 B2
(45) Date of Patent: Jan. 30, 2018

(54) METHOD FOR IMPROVING PERFORMANCE OF A METHOD FOR COMPUTATIONALLY PREDICTING A FUTURE STATE OF A TARGET OBJECT, DRIVER ASSISTANCE SYSTEM, VEHICLE INCLUDING SUCH DRIVER ASSISTANCE SYSTEM AND RESPECTIVE PROGRAM STORAGE MEDIUM AND PROGRAM

(71) Applicant: HONDA RESEARCH INSTITUTE EUROPE GMBH, Offenbach/Main (DE)

(72) Inventors: Jens Schmüdderich, Offenbach (DE); Sven Rebhan, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/145,287

(22) Filed: May 3, 2016

(65) Prior Publication Data

US 2016/0325743 A1 Nov. 10, 2016

(30) Foreign Application Priority Data

May 4, 2015 (EP) .................................... 15166244

(51) Int. Cl.
*B60W 30/095* (2012.01)
*G06K 9/00* (2006.01)
(Continued)

(52) U.S. Cl.
CPC ........ *B60W 30/0956* (2013.01); *B60W 30/14* (2013.01); *G06K 9/00771* (2013.01);
(Continued)

(58) Field of Classification Search
CPC ............. B60W 30/0956; B60W 30/14; B60W 2550/10; B60W 2550/30; G06K 9/00771; G06K 9/00805; G06K 9/3241; G06N 5/02
See application file for complete search history.

(56) References Cited

U.S. PATENT DOCUMENTS

2003/0204298 A1* 10/2003 Ahmed-Zaid ...... B60K 31/0008
701/96
2006/0095193 A1* 5/2006 Nishira ..................... B60T 7/22
701/96

(Continued)

FOREIGN PATENT DOCUMENTS

EP 2 562 060 A1 2/2013

*Primary Examiner* — Calvin Cheung
(74) *Attorney, Agent, or Firm* — Squire Patton Boggs (US) LLP

(57) ABSTRACT

The invention regards a method for improving performance of a method for computationally predicting a future state of a target object, a driver assistance system and a vehicle with such driver assistance system. First data describing a traffic environment including a target object is acquired. On the basis of the acquired data at least one prediction step for estimating a future state of an object in the traffic environment is performed and a signal indicative of a prediction result describing an estimated future state of the target object and/or an ego vehicle is generated. An actual state of the target object and/or the ego vehicle is observed and quality of the prediction by comparing the observed actual state and the prediction result is estimated. Finally the prediction result and/or parameters of the prediction algorithm is adapted.

16 Claims, 8 Drawing Sheets

(51) Int. Cl.
*B60W 30/14* (2006.01)
*G06N 5/02* (2006.01)
*G06K 9/32* (2006.01)

(52) U.S. Cl.
CPC ........... *G06N 5/02* (2013.01); *B60W 2550/10* (2013.01); *B60W 2550/30* (2013.01); *G06K 9/00805* (2013.01); *G06K 9/3241* (2013.01)

(56) References Cited

U.S. PATENT DOCUMENTS

2010/0315505 A1* 12/2010 Michalke ................ G06T 7/251
 348/118
2017/0039855 A1* 2/2017 Maeda ............... B60K 31/0008

* cited by examiner

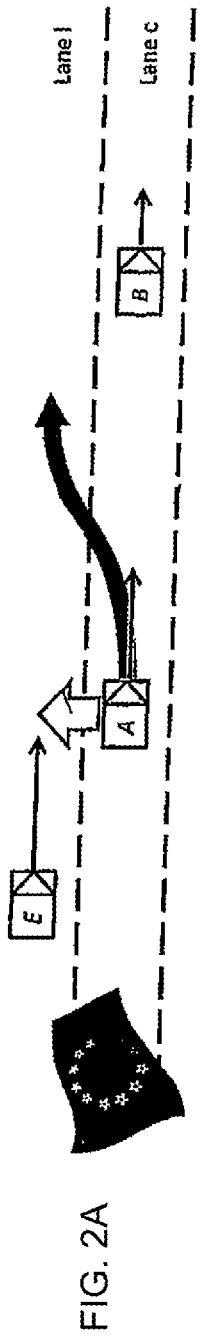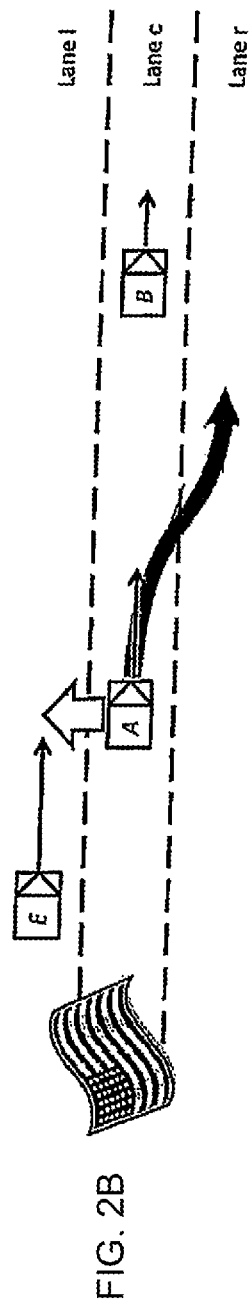

METHOD FOR IMPROVING PERFORMANCE OF A METHOD FOR COMPUTATIONALLY PREDICTING A FUTURE STATE OF A TARGET OBJECT, DRIVER ASSISTANCE SYSTEM, VEHICLE INCLUDING SUCH DRIVER ASSISTANCE SYSTEM AND RESPECTIVE PROGRAM STORAGE MEDIUM AND PROGRAM

This application claims priority under 35 USC § 119a of European Patent Application No. 15 166 244.2, filed on May 4, 2015, the contents of which is hereby incorporated by reference in its entirety.

BACKGROUND

Field

The invention relates to a method for improving the performance of a method for computationally predicting a future state of an object. The invention also regards a respective driver assistance system executing such method, a vehicle including such driver assistance system as well as the program storage medium and a respective program.

Description of the Related Art

Over the last years, driver assistance systems became more and more comfortable. Due to their increased capability of influencing the actuation of car controls such as brakes and/or throttle and/or steering, they became powerful means for assisting a driver. But of course the capability of correctly estimating a traffic situation is limited. This will sometimes lead to wrong evaluations of a scene in which the host vehicle on which such driver assistant system is mounted is part of. There is no question that assisting drivers in making their decisions or directly influencing the driving of the vehicle may improve safety on the roads, in particular in dense traffic conditions. But on the other side, it is also evident that the acceptance of such systems strongly depend on a low number of "wrong" predictions or automated interactions with the controls of the vehicle that do not correspond to the driver's own interpretation of the scene.

One approach to improve acceptance of such systems has been made by introducing the so-called context-based prediction being capable of producing a prediction result on a specific type of behavior which is assumed to be performed by a target object. This context-based prediction is a first prediction step in a prediction system that also uses a so-called physical-prediction. The physical-prediction uses a result of the context-based prediction including information about a specific type of behavior which is predicted to be performed by the target vehicle, and performs a physical prediction based on which the results are confirmed or dismissed and thereby constitutes a second prediction step in the entire prediction method. Such system is described in EP 2 562 060 A1. The benefit of such system is that a future movement behavior of a target object may not be determined only when it has already started, but it may be considered already at a point in time where only analysis of the entire situation allows determining a behavior likely to happen. For example a lane change situation where another vehicle most probably will cut in may be recognized early and thus, the host vehicle could present a warning or could slow down already automatically even before the lane change actually has started in order to avoid harsh braking situations.

As mentioned earlier, such systems will only be accepted by the driver of the host vehicle in case that the interpretation of the scene by the prediction system does not lead to wrong prediction results too often. The acceptance could be improved if the system would be capable to recognize that the usual driver's intention or performed behavior in particular situations deviates from the suggested or performed behavior of the prediction system.

Thus, there is a need to improve the performance of a method for computationally predicting a future state of a target object.

SUMMARY

According to certain embodiments of the present invention, the improvement is achieved by analyzing the current system performance and then adapting the prediction result or prediction algorithm for example by weighting the result or adapting parameters used in the prediction algorithm for future prediction cycles. For estimating a future state of a target object by such prediction at first data describing a traffic environment including this target object are acquired. Based on these data, at least one prediction step is performed.

Based on the prediction result, a signal indicative of the results and describing an estimated future state of the target object and/or the ego-vehicle is generated. The prediction result for example contains information about predicted future state of the target object or the ego-vehicle including at least one of position, velocity, acceleration, behavior, trajectory and operation of controls of a vehicle. This signal can, for example, be used in order to indicate a warning to the driver of the host vehicle so that he can make decisions on how to react on the future state which is expected for the target vehicle or can be used to autonomously or semi-autonomously control the ego-vehicle's driving.

According to the invention, it is observed which actual state the target object or ego-vehicle has when the situation further evolves. On the basis of a comparison of the observed actual state and the estimated future state for that point in time a quality of the prediction is estimated. If no satisfying quality can be achieved, an adaptation of the prediction result and/or parameters used in the prediction algorithm is performed.

The observed actual state may either be a state of the target object or of the ego-vehicle, for example a driver operation of controls such as throttle, steering or brakes. Others may be actual positions, velocity, behavior or the like of the target object. Then it is determined to what extend the observed state is in line with the prediction for the state of the target object. Thus, quality of the prediction is estimated. Based on this estimation of quality then model parameters are adapted and used for future prediction cycles or prediction results of future prediction cycles are adapted.

Thus, with an analysis of a correspondence between the prediction result and an actual state of a target object or the behavior of the host vehicle driver in relation to the prediction result the system's performance can be improved. Taking into consideration the estimated quality, an improvement is achieved by adapting parameters of the prediction algorithm or adapting results of future prediction cycles.

Further details and aspects are claimed in the dependent claims.

It is advantageous that at least a context based prediction step and/or a physical prediction step is performed in the prediction. In the context-based prediction step, the probability that the target object will execute a particular movement behavior in the future is calculated as estimated future state. A context-based prediction result based on this calculated probability is output. This context-based prediction result gives information about a type of behavior likely to be performed by the target vehicle in the future. For example, a lane change situation as described above, it is output for the target vehicle if the driver of the target vehicle will perform a lane change and thus, cut in or not. In a physical prediction step, for example future positions of the target object as the estimated future states of the target object are estimated, preferably taking into consideration the context-based prediction result and its corresponding parametric trajectory model. The physical prediction step delivers a physical prediction result as an output.

It is advantageous to estimate the quality of the prediction by determining a mismatch rate between predicted and observed future state. Such mismatch rate can be calculated easily and gives an objective measure how often the prediction did not correctly estimate the situation development.

A confidence value for weighting the prediction result may be determined and/or a parameter set that is used for a parametric trajectory model of the physical prediction is corrected. The weighting and/or the corrected parameter set are used when predictions are performed in the future.

Preferably, the confidence value is weighted or scaled only in case that a mismatch rate between the observed actual state and the prediction result exceeds a predetermined threshold. By setting such threshold, it is possible to stabilize the behavior of the prediction system and thus avoid to react on single wrong evaluations so that a reliable prediction is performed.

Furthermore, it is preferred that a confidence value for a prediction result is decreased in case of false positive predictions so that the influence of prediction results from the context-based prediction on the further processing is reduced, since it is taken into consideration only to a minor degree. A false positive prediction is for example a prediction of a cut-in of the target vehicle when it is then recognized that in fact the target vehicle does not cut-in. On the other side, it is preferred if the confidence value for the context-based prediction result is increased in case of false negative prediction which means that a particular behavior is predicted not to happen, but nevertheless is observed. A false negative prediction is for example prediction of the target vehicle performing no cut-in but recognizing that the target vehicle in fact performs a cut-in.

Furthermore, in order to individually improve a prediction for a behavior to be executed and behavior not to be executed, separate mismatch rates are determined for false negative predictions and for false positive predictions of a particular behavior.

In order to allow a detailed analysis of the reasons for wrong prediction results, it is furthermore preferred that observed actual states that match the estimated states according to the physical prediction result, observed states that match the context-based prediction result but not the estimated positions of the physical prediction result and observed that do not match the context-based prediction result and that do not match the estimated positions either are stored individually. On the basis of these stored observed states of the target vehicle, then a parameter optimization algorithm may be run. But not only the parameter optimization for parameters of the parametric trajectory model of the context based prediction algorithm may be optimized, but also the threshold for determining a predicted future movement behavior on the basis of the optimized parameters may be set.

Finally, it is preferred that the number of observed states that are used for an optimization of the parameters is limited which can be performed either by limiting the time period for which the observed actual states are stored or directly limiting the number of observed behaviors for example positions of a target vehicle are stored.

BRIEF DESCRIPTION OF THE DRAWINGS

For explanation of further aspects and features of the present invention, a detailed embodiment will now be explained on the basis of the annexed drawings. In the annexed drawings there is shown in FIG. 1 a system overview for a general prediction system;

FIGS. 2A and 2B a first situation for explaining the method for improving a driver assistance systems performance;

DETAILED DESCRIPTION

Before aspects and preferred embodiments of the system and method are explained in detail, it is to be noted that the method is explained on the basis of a prediction of a movement behavior of a target object by use of a two step prediction algorithm using a context based prediction step and a physical based prediction step. But the method can also be used for prediction with only one prediction step. Further, the following description refers to type of behavior and vehicle positions as well as vehicle control operation as future states. But of course other future states that can be predicted and/or observed can be subject of the invention as well. A further example may be velocity. It is also to be noted that the following examples are directed to using the invention in an advanced driver assistance system that automatically controls at least partially driving of the vehicle. But of course it is not necessary to implement the invention in such advanced driver assistance system.

Figure 1:
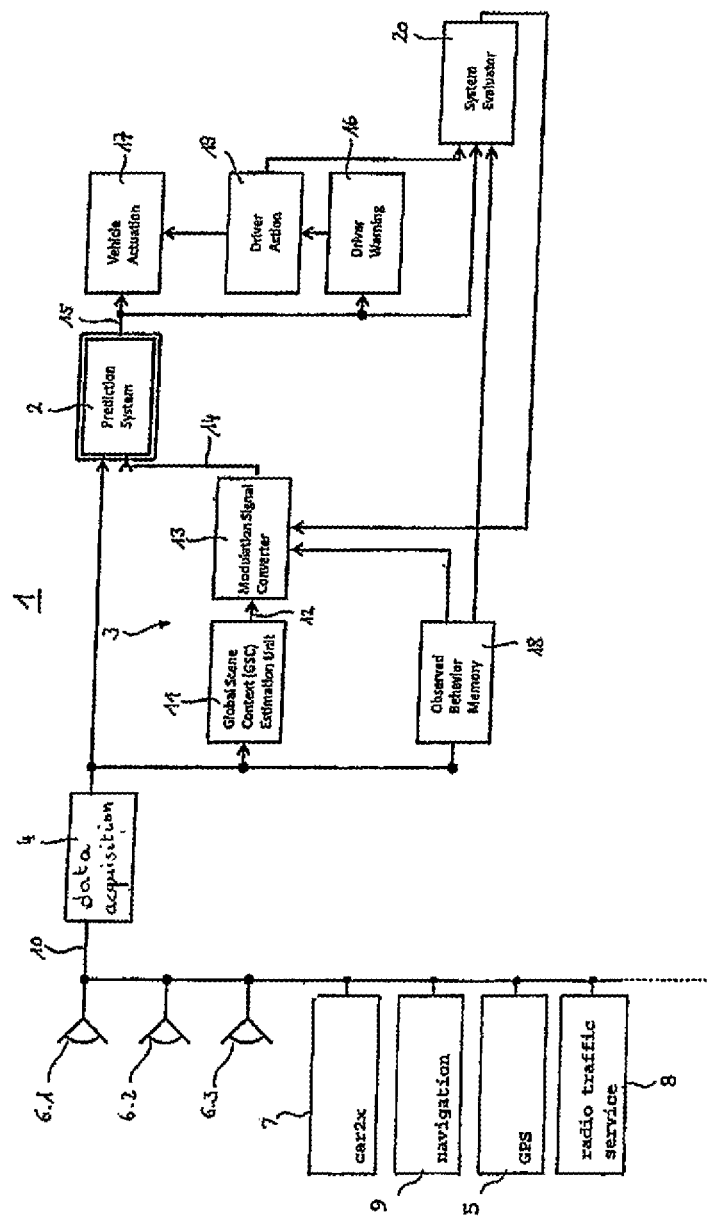

In FIG. 1 an overview over an advanced driver assistance system 1 comprising a prediction system 2 used for predicting a future movement behavior as one example of an estimated future state of at least one target object (vehicle) and including a global scene context (GSC) unit 3. As shown in FIG. 1 data 10 related to (or describing) a traffic environment of the host vehicle is acquired from one or more sensors, 6.1, 6.2, 6.3 . . . . The sensors 6.1, 6.2, . . . may be of different types or may be of the same type and can in particular be mounted on the host vehicle such that in particular the forward driving direction of the host vehicle can be observed. The sensors 6.1, 6.2, 6.3, . . . are configured to measure the relative speed, position or any other variable that allows to determine the relation between a plurality of traffic participants including the host vehicle.

Data 10 relating to the traffic environment may also be acquired from sources such as car-to-car or car-to-infrastructure communication means 7, radio traffic service receivers 8, car navigation means 9, GNSS receiver 5 or any other interface to external or internal (on-board) sources for individual information elements of the traffic environment of the host vehicle.

The acquired data 10 describing the traffic environment is provided to a prediction system unit 2. The prediction system unit 2 provides a prediction result 15 to a vehicle actuation means 17 and causes either directly actuating controls of the host vehicle such as steering, brakes or throttle on the basis of the prediction result 15 or by means of a controlling unit not shown in FIG. 1. Typically, an actuation signal generated based on the prediction result 15 is used for performing throttle control and/or brake control. Furthermore, additionally or alternatively, the prediction result 15 causes either a driver warning to be output by a driver warning means 16 which may be for example in the simplest case a signal light.

Besides supplying the data 10 describing a traffic environment of the host vehicle to the prediction system unit 2, the data 10 describing a traffic environment may also be provided to a global scene context estimation unit (GSC estimation unit) 11. The GSC estimation unit 11 processes the data and generates global scene context information (GSC information) 12 based on the data 10 describing the traffic environment.

The GSC estimation unit 11 analyzes the individual elements of the input data 10 describing a traffic environment in order to determine a global scene context. For example the GSC estimation unit 11 can analyze the velocity of all traffic participants which are recognized by the sensors 6.1, 6.2, . . . and decide if a global speed limit for vehicles is to be determined.

The GSC information 12 is supplied to a modulation signal converter unit (GSC converter unit) 13 for processing and generating a prediction adaptation information 14 for the prediction system unit 2.

The converter unit 13 is configured to derive from the estimated GSC information 12 received from the GSC estimation unit 11, specific information how to modify the prediction. An output by the converter unit 13 can for example include parameters for directly modifying results of the behaviour prediction steps in the prediction system unit 2.

The prediction system unit 2 comprises a direct indicator calculating unit for calculating direct indicators on the basis of the data 10 related to the traffic environment that is acquired. The data 10 describing the traffic environment contain information about position, speed, . . . and are further provided to an indirect indicator calculation unit for calculating indirect indicators for a context-based prediction which is described later in detail. These indirect indicators may comprise conventionally calculated indirect indicators which are calculated from the signals of sensors 6.1, 6.2, 6.3 in the indirect indicator calculation unit. Information regarding indicator calculation and performing behavior prediction of traffic objects will be given in detail later.

Figure 3:
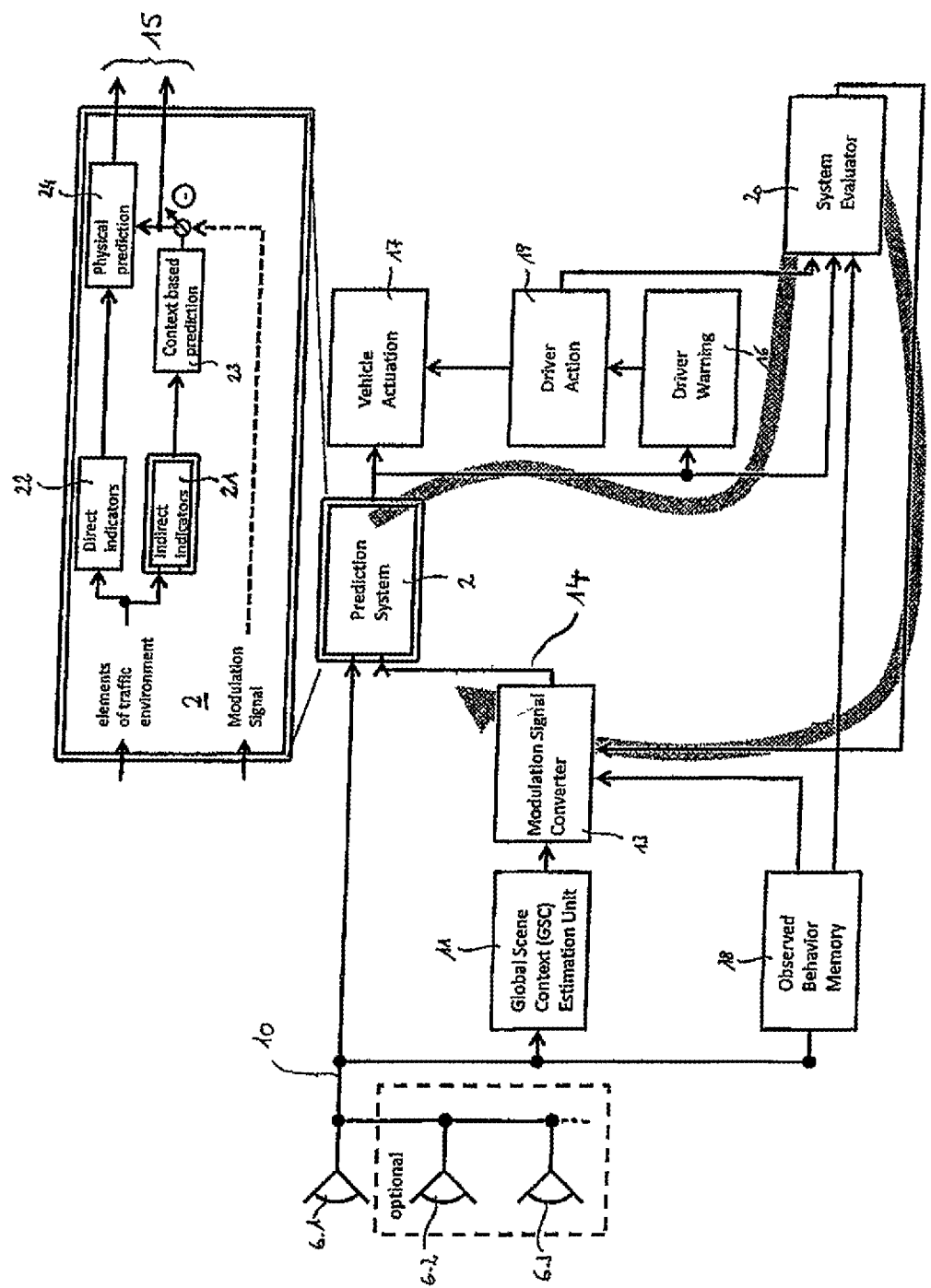
FIG. 3 a scheme for explaining the execution of the inventive method.

The direct indicators are supplied to a physical prediction unit 24 and the indirect indicators (and maybe direct indicators additionally) are supplied to a context-based prediction unit 23 of the prediction system unit 2 as shown in the enlarged detail in FIG. 3. The result of the context-based prediction calculation is then fed to the physical prediction calculation unit 24 for example for validation reasons and plausibility check. In the end, the prediction result 15 is output by the prediction system unit 2 that causes for example a driver warning information to be performed in the respective driver warning unit 16. It is to be noted that the prediction result 15 may consist of a context-based prediction result, a physical prediction result or both. Furthermore, additionally or alternatively, the signal is supplied to the vehicle actuation unit 17 that might be either directly actuated on the basis of the signal or by means of a controlling unit that receives a signal provided by the prediction system unit 2 as an input. Typically, the output signal is used for throttle control and/or brake control.

As it will be described later in detail the present invention may in particular, but not exclusively improve the performance of a driver assistance system 1. The system as described up to now has naturally its limits in prediction accuracy. In order to improve the system such that the prediction results better correspond to the development of real traffic situations the system further comprises an observed state memory, in the illustrated embodiment a memory 18 for storing an observed behavior, and/or a driver action observation means 19 and a system evaluator 20. As it will be described later in detail with memory 18 the acquired data for example position data are stored so that the real development of the traffic situation can be analyzed with respect to its matching to the prediction result. This is performed by the system evaluator 20. In the system evaluator 20 thus a correspondence between a prediction result and the real traffic situation development is analyzed to estimate quality of the prediction.

Alternatively a driver action can be observed for example if the driver steps on the throttle and it is determined whether such driver behavior corresponds to the prediction result or if the driver behavior contradicts an action that would be suggested or controlled on the basis of the prediction result by the driver assistance system 1.

By analyzing the actual state of the target vehicle, for example its behavior or of the ego-vehicle with respect to its prediction result the driver assistance system is optimized with respect to its own performance which means that the prediction accuracy is improved. By comparing a driver action as an actual state with a suggested or performed operation on the basis of the prediction result the system performance is improved taking into account the desires of an individual driver. Both aspects will be described later on in detail but before these details are explained at first the context based prediction and the physical prediction shall be explained after giving a short definition of relevant expressions for the understanding of a preferred prediction algorithm and the invention.

Definitions

Host vehicle: A host vehicle is a vehicle in a traffic situation which has the driver assistance system according to the invention mounted thereon and which is equipped with the sensors and a computing system that allows the computation of a likely future behavior of other traffic vehicles.

Sensor: A sensor may be any means that can deliver information suitable for describing a traffic scene at a point in time. Such sensors may be cameras, radar, lidar or the like.

Target object (target vehicle): A target object or vehicle is an object or vehicle being observed by generating information using at least one sensor and for which a future behavior shall be estimated.

$x_i^t$: traffic object i at time t with $x_i^t = (p_{i,x}^t, p_{i,z}^t, v_{i,x}^t, v_{i,z}^t, a_{i,x}^t, a_{i,z}^t)^T$, $p_{i,x}^t, p_{i,z}^t$ being the lateral and longitudinal position, $v_{i,x}^t, v_{i,z}^t$ being the lateral and longitudinal velocity, and $a_{i,x}^t, a_{i,z}^t$ being the longitudinal and lateral acceleration of traffic object i at time t.

$S^t$: scene at time t, consisting of all perceived traffic objects and road environment (lanes, lane-markings, traffic signs, traffic-lights, etc.) at time t.

$B=\{b\}$: set of behaviors a traffic object ("participant") can perform. In the following $b_i^t \in B$ will be used to denote the behavior traffic participant $x_i^t$ is performing at time t.

Indicators:

We define indicators $$I = \bigcup_j \tau_j(\cdot)$$

as a set of functions $$\tau_j(x^t, S^t) = (v_j^t, c_j^t) \quad (1)$$

where $v_j^t$ is a measurable variable conveying information about the future or ongoing behavior of a target vehicle at time t and $c_j^t$ a confidence about the true-state of the variable $v_j^t$. The confidence $c_j^t$ is obtained by combining the sensor-confidence of all elements of $S^t$, which have been evaluated for the computation of $v_j^t$, where the sensor confidence is a value for the reliability of the sensed information. Without loss of generality indicators can be defined such that $v_j^t \in [0, 1]$, i.e. the values are normalized between 0 and 1 e.g. by means of a Fermi-function. Such a normalization is useful for the combination of indicators as described below.

It is differentiated between direct and indirect indicators.

Direct indicators $I_D \subset I$:

Direct indicators provide variables, which are observable if and only if the behavior to be detected has started. E.g. for predicting a lane-change, direct indicators are lateral velocity, lateral position relative to the lane, changing orientation relative to the lane, or changing orientation relative to other traffic participants.

Orientations as such are always observable, but the change of orientation can only be observed when the vehicle is changing lanes, because then it is rotating around the yaw-axis. A position change is detected, because the lateral velocity is the change of lateral position over time.

Indirect indicators $I_I \subset I$:

Indirect indicators provide variables, which are already observable before the predicted behavior starts. We define indirect indicators as the set of all possible indicators without the set of direct indicators:

$$I_I = I \setminus I_D \quad (2)$$

There are two types of indirect indicators:

1. The first type of indicators relates to information about a relation between at least one traffic participant and one or more other traffic participants or static scene elements.
   For example at least one of the following indicators can be available:
2. For example at least one of the following indicators can be available:
   fitting-left-gap: $\tau_{fitting-left-gap}(x_i^t, S^t)$ provides a value $v_{fitting-left-gap}^t \approx 1$ if a gap fitting to $x_i^t$'s position, velocity, and length is now or soon available on the left lane. Let $x_{lp}^t$ depict the predecessor of $x_i^t$ on the left neighboring lane of $x_i^t$, and let $x_{ls}^t$ depict the successor of $x_i^t$ on the left neighboring lane of $x_i^t$. Then a gap is defined by a frontal position, a rear position, a frontal velocity, and a rear velocity. The frontal position and frontal velocity equal those of $x_{lp}^t$, the rear velocity equals that of $x_{ls}^t$. The rear position equals that of $x_{ls}^t$, plus the length of $x_{ls}^t$ and a speed-dependent safety-margin. If $x_{lp}^t \in S^t$, i.e. $x_i^t$ has no left predecessor, then the frontal position and velocity are set to infinity. If $x_{ls}^t \in S^t$, i.e. $x_i^t$ has no left successor, then the rear position and velocity are set to zero.

The fitting of a gap g to a vehicle $x_i^t$ can be determined by multiple factors:
The ratio of the length of $x_i^t$ and the gap size,
the longitudinal TTC (Time To Contact) of $x_i^t$ with the gap's frontal border, defined as the longitudinal TTC between $x_i^t$ and $x_{lp}^t$, with the longitudinal TTC defined as $$ttc(x_i^t, x_j^t) = (p_{i,x}^t - p_{j,x}^t)/(\dot{p}_{j,x}^t - \dot{p}_{i,x}^t) \quad (3)$$

the longitudinal TTC of with the gap's rear border, and the time when the gap is available, the so called "Time To Gap" (TTG). If $x_i^t$ is behind the gap g, then the TTG equals the longitudinal TTC to the gaps rear border. If $x_i^t$ is ahead of g, the TTG equals the longitudinal TTC to the frontal gap border. If the gap is available now, then the TTG equals zero.

fitting-right-gap: In analogy $\tau_{fitting-right-gap}(x_i^t, S^t)$ provides a value $v_{fitting-right-gap}^t \approx 1$ if a fitting gap is available on the right neighboring lane of $x_i^t$. Here the gap is defined by the predecessor $X_{rp}^t$ and successor $x_{rs}^t$ on the right lane.

approaching-predecessor: The indicator $\tau_{approaching-predecessor}(x_i^t, S^t)$ provides a value $v_{approaching-predecessor}^t \approx 1$ if $x_i^t$ is approaching a nearby predecessor on its own lane. This is derived from the longitudinal TTC between $x_i^t$ and its predecessor.

fitting-left-lane: $\tau_{fitting-left-lane}^t(x_i^t, S^t)$ creates a value $v_{fitting-left-lane}^t \approx 1$ if the lane left of $x_i^t$ fits well to $x_i^t$'s driving. This is computed by the TTC between $x_i^t$ and its predecessor on the left lane and/or by comparing the current speed of $x_i^t$ with the average speed driven on the left lane.

fitting-current-lane: $\tau_{fitting-current-lane}^t(x_i^t, S^t)$ creates a value $v_{fitting-current-lane}^t \approx 1$ if the lane of $x_i^t$ fits well to $x_i^t$'s driving. This is computed by the TTC between $x_i^t$ and its predecessor and/or by comparing the current speed of $x_i^t$ with the average speed driven on $x_i^t$'s lane.

fitting-right-lane: $\tau_{fitting-right-lane}^t(x_i^t, S^t)$ creates a value $v_{fitting-right-lane}^t \approx 1$ if the lane right of $x_i^t$ fits well to $x_i^t$'s driving. This is computed by the TTC between $x_i^t$ and its predecessor on the right lane and/or by comparing the current speed of $x_i^t$ with the average speed driven on the right lane.

tailgating: $\tau_{tailgating}(x_i^t, S^t)$ creates a value $v_{tailgating}^t \approx 1$ if $x_i^t$ is tailgating its predecessor on its own lane. This is computed by the ratio of the longitudinal distance between $x_i^t$ and its predecessor, divided by the velocity-depended safety-distance.

evade-to-gap: $\tau_{evade-to-gap}(x_i^t, S^t)$ creates a value $v_{evade-to-gap}^t \approx 1$ if $x_i^t$ is approaching its predecessor on its own lane and if a fitting gap is or will be available before $x_i^t$ collides with its predecessor. This is computed by the difference between the longitudinal TTC and TTG, in combination with the indicators $\tau_{approaching-predecessor}(\bullet)$ and $\tau_{fitting-left-gap}(\bullet)$, where $(\bullet)$ is a placeholder for an arbitrary argument.

accelerate-to-gap: $\tau_{accelerate-to-gap}(x_i^t, S^t)$ creates a value $v_{accelerate-to-gap}^t \approx 1$ if $x_i^t$ is accelerating (or breaking), and if this acceleration is necessary to better fit to a gap's position or velocity (i.e. the gap is moving due to the movement of the predecessor and successor on the left or right neighboring lane with their velocity). This is evaluated by computing the TTC considering the gap's and the $x_i^t$'s acceleration and combining the results with the above indicator accelerate-despite-ttc: $\tau_{accelerate-despite-ttc}(x_i^t,S^t)$ creates a value $v_{accelerate-despite-ttc}^t \approx 1$ if $x_i^t$ is accelerating faster than its predecessor, and if the TTC between the two is low.

successor-approaching: $\tau_{successor-approaching}(x_i^t,S^t)$ provides a value $v_{successor-approaching} \approx 1$ if $x_i^t$ is approached by a nearby successor on its own lane. This is derived from the longitudinal TTC between $x_i^t$ successor and $x_i^t$.

free-lane: $\tau_{free-lane}(x_i^t,S^t)$ provides a value $v_{free-lane} \approx 1$ if the lane ahead of $x_i^t$ is free, i.e. if there is no predecessor in the sensor range.

free-lane-and-let-overtake: $\tau_{free-lane-and-let-overtake}(x_i^t,S^t)$ provides a value $v_{free-lane-and-let-overtake} \approx 1$ if
$x_i^t$ has no predecessor (indicated by $\tau_{free-lane}(\bullet)$ and there is a gap on the neighboring lane (indicated by $\tau_{fitting-right-gap}(\bullet)$) and
$x_i^t$ has a successor $x_i^t$ on its lane, which is so fast, that $x_i^t$ can cut-out into g, $x_i^t$ can overtake, and $x_i^t$ can cut back in to its originating lane without the need to adapt its velocity to g. This part of the indicator is estimated by comparing the longitudinal TTC between $x_i^t$ and g and the TTG between $x_i^t$ and the gap built by $x_s^t$ and the successor of $x_s^t$.

traffic-signs: This group of indicators produce values $v_{traffic-sign} \approx 1$ if $x_i^t$ has to adapt its behavior to comply with a traffic-sign. E.g. speed-sign indicators, e.g. a speed limit-signs, produce a high value if $x_i^t$ is faster than indicated by the speed-sign. A no-passing sign produces a high value if $x_i^t$ is on the left-lane/speed-lane and if it is addressed by the no-passing sign.

lane markings: This group of indicators produce values $v_{lane-markings}^t \approx 1$ if $x_i^t$ has to adapt its behavior to comply with the lane-markings. E.g. a line-end indicator could produce a high value if $x_i^t$ is driving on a lane, which is about to end. Or a dashed-line indicator could produce a low value if $x_i^t$ is driving on a lane which does not permit lane-changes.

combinations of the above: The indicators above can be recombined to create new indicators. E.g. $\tau_{fitting-left-gap}(\bullet)$ can be combined with $\tau_{approaching-predecessor}(\bullet)$ to an indicator which gives a high value if a gap is available and $x_i^t$ is approaching $x_p^t$. The combination is done in a way that a high value of one of the indicators can compensate for a medium value of the other indicator. This is achieved by a weighted summation of the two values: $v_{combined} = \min(1, w_1 v_{fitting-left-gap} + w_2 v_{approaching-predecessor})$ with $$\sum_i w_i > 1.$$

2. The second type of indirect indicators conveys information about the driver intention, actively communicated by the traffic participant whose behavior is to be predicted. Examples are:

turning-signal: This indicator produces a high value if the target vehicle's turning signal is activated.

breaking-light: This indicator produces a high value if the target vehicle's breaking light is activated.

car-to-car-communication: This group of indicators can respond to communicated changes of the sending vehicle's velocity or heading.

As an alternative to the described indicators one could also use indicators which are not normalized to [0,1]. In particular, threshold values could be defined indicating whether an indicator is present or not. Therefore, when a threshold is exceeded, the respective indicator is deemed to be present.

Physical Prediction

Physical prediction compares measured points with trajectories in situation models. It determines a set of potential trajectories for action generation. It also can indicate when the context based prediction/behavior-recognition went wrong (self-validation).

The physical prediction uses a set of predictors $\Phi = \{\varphi^b\} b \in B$.

$X_i^t = (x_i^{t-T}, \ldots, x_i^t)$ defines the history of the last T+1 states of traffic participant i.

Let $\mu(p_z,a) = p_x$ be a parametric trajectory model, returning a lateral position $p_x$ given a longitudinal position $p_z$ and a parameter-set a.

Let $A^b = \{a\}$ be a set of parameters for $\mu$, covering different trajectories for behavior b.

The task of a physical predictor $\varphi b(p_{i,x}^{t+\Delta t}, p_{i,z}^{t+\Delta t}, X_i^t, S^t)$ is to estimate the likelihood that $x_i^t$ will be at position $p_{i,x}^{t+\Delta t}, p_{i,z}^{t+\Delta t}$ at time $t+\Delta t$, given the history of states $X_i^t$ and the current situation $S^t$, for a behavior b. This likelihood is estimated by $$\varphi^b(p_{i,x}^{t+\Delta t}, p_{i,z}^{t+\Delta t}, X_i^t, S^t) = v^b p_{i,x}^{t+\Delta t}, p_{i,z}^{t+\Delta t}, X_i^t, S^t) p(b_i^{t+\Delta t} | x_i^t, S^t) \quad (9)$$

$v^b(\bullet)$ is a so-called validator function. It has the important property, that it returns value $\approx 1$ if it has no evidence indicating that $x_i^t$ will not be at point $(p_{i,x}^{t+\Delta t}, p_{i,z}^{t+\Delta t})$ at time $t+\Delta t$. Only if it has evidence indicating that $x_i^t$ will not be at that point does it return a value lower than 1. Consequently, the physical predictor $\varphi^b(\bullet)$ relies on the context based prediction to predict if $x_i^t$ will perform behavior $b_i^{t+\Delta T}$, it only restricts the space, that is, the way how $x_i^t$ will perform this behavior.

The validator function validates the evidence by $$v^b(p_x, p_z, X_i^t, S^t) = \sum_{a \in A^b} \lambda_p(p_x, p_z, a) \lambda_h(X_i^t, a) \lambda_s(S^t, a) \quad (10)$$

$\lambda_p(p_x,p_z,a)$ estimates the likelihood for the point $(p_x, p_z)$ to lie on a trajectory modeled with parameter a. This is computed as:

$$\lambda_p(p_x, p_z, a) = \begin{cases} 1 & \text{if } p_x = \mu(p_z, a) \\ 0 & \text{otherwise} \end{cases} \quad (11)$$

$\lambda_h(X_i^t,a)$ computes the likelihood for the history $x_i^t$ to originate from a trajectory modeled with parameter a. This is estimated by $$\lambda_h(X_i^t, a) = \exp\left(-\frac{1}{2\sigma^2(T+1)^2} \sum_{\tau=0}^{T} (p_x^{t-\tau} - \mu^b(p_z^{t-\tau}, a))^2\right) \quad (12)$$

$\lambda_s(S^t,a)$ computes the likelihood for the trajectory modeled with parameter a to comply with the current situation. This is based on statistics of how traffic participants conduct a specific behavior dependent on the other traffic participants behavior. Those parameters resulting in trajectories which lead to a high TTC to other traffic participants are favored over those, with a low TTC.

As an alternative to the equation (12) for computing the difference between the model and the measured positions, any other metric could be used.

The reason for a driver executing a certain behavior strongly depends on the situation the driver is in. For example, on a highway a driver will change lanes to overtake another vehicle, whereas at an inner-city intersection he will change lanes to reach a turn-lane.

In consequence, this means that indicators for context based prediction also strongly depend on the situation.

Also the execution, i.e. the way in which the behavior is executed, depends on the current situation. For example, on a highway the trajectory of a lane-change significantly differs from that in the inner-city, due to the different dynamics.

This is addressed by defining situation specific models for each behavior b, so called situation models $m_i^b$ defined as $$m_i^b = (\gamma_j^b, I_j^b, \mu^b, A^b) \quad (15)$$

Thus a situation model can be defined for each situation, in which traffic participants should be predicted. These situation models contain a specialized context based prediction $\gamma_j^b$, specialized indicators $I_j^b$, a specialized parametric model $\mu^b$ and a parameter-set $A^b$ fitting to the model.

As the computation of predictions in all available situation models is computationally too exhaustive, the required situation models can be preselected based on digital map information or sensory information by a model selector. For example, recognizing lane-markings, e.g. yellow lane markings, can activate special models to handle lane-change in a construction site. Map-data about an upcoming entrance or exit to the highway can activate models to handle lane-merging etc. Further, gps-positioning can be used to activate country specific rules, like a preferred lane for overtaking. For the following explanations it is assumed that the host vehicle drives in a traffic system when overtaking is allowed only on a left side and the host vehicle and other traffic participants drive on a highway or similar type of road.

In FIGS. 2A and 2B, there is illustrated a first situation for explaining the method and driver assistance system according to the present invention. FIGS. 2A and 2B show the same traffic situation but in two different traffic systems. FIG. 2A shows European right hand traffic in which overtaking another vehicle is allowed only on the lane left of the vehicle to be overtaken. Thus, FIGS. 2A and 2B show lane c and lane l left of lane c (with respect to driving direction of vehicles). On lane c a vehicle B is driving at a first speed. Target vehicle A is approaching vehicle B from behind as target vehicle A is driving on the same lane c but with a speed higher than the speed of vehicle B. In the figures the speed of each of vehicles is illustrated by the length of the solid line arrow.

The ego vehicle E is driving on lane l and is approaching vehicles A and B because of its higher speed. Conventional prediction systems capable of performing context based prediction as illustrated above that are set up for use in Europe will predict in such a traffic situation that target vehicle A will cut into lane l. For the European traffic system in FIG. 2A as mentioned this context-based prediction will thus be correct, because target vehicle A of course can overtake vehicle B only on its left side.

The situation is different in case that the same prediction system or driver assistance system is used for example in the US. In FIG. 2B, the speed of each of the vehicles A, B and E is similar to the speed as explained for the European example in FIG. 2A. Contrary to Europe in the US it is also allowed to overtake on a lane adjacent on the right side of the vehicle (in driving direction) to be overtaken. And thus as indicated by the grey arrow target vehicle A may overtake vehicle B on its right side. If it turns out that the real traffic situation develops in such a way that target vehicle A overtakes vehicle B on its right side but the prediction result of context-based prediction of course was the same as in the European case, prediction and actual development of the situation do not match. A low correspondence between the observed actual behavior (overtaking on the right side) and predicted behavior (cut in on lane L) can be recognized. If the driver assistance system presents a warning to the driver because of the prediction result "target vehicle A will cut into lane l" the driver of the ego vehicle E will be distracted. Even more severe if automated driving is realized in host vehicle E the speed of vehicle E may already have been reduced because of the prediction result that target vehicle A will cut in.

With reference to FIG. 3 it will now be explained how with the inventive method and system the number of such wrong predictions will be reduced. FIG. 3 shows a simplified diagram which basically corresponds to FIG. 1 but where the signal flows are illustrated that lead to the improvement of the overall system performance. As it was explained already above the data 10 containing the information about the traffic environment of the ego vehicle E is supplied to the prediction system 2. In addition the data 10 is supplied to memory 18 so that the observed behavior of the target vehicle A is known to the system. Thus, after further development of the traffic situation like in the case as illustrated for the US traffic system it is possible to compare the actual behavior of target vehicle A and the predicted behavior of target vehicle A. Thus, in the situation as explained above a mismatch between the real behavior and the predicted behavior is determined. This determination is performed in the system evaluator 20. The system evaluator 20 is provided with the information about the actual behavior of target vehicle A from memory 18. Such information may either be supplied from the memory 18 by supplying "raw data" which means for example a set of position information at particular successive points in time or already as interpretation of such "raw data". Such an interpretation may be for example only the information that target vehicle A did not cut in. In such a case it is clear that the memory 18 in fact has a capability going beyond the pure storage of data and may also be able to analyze data 10 with respect to states of a target vehicle and only store such actual states.

On the other side the prediction system 2 supplies the prediction result or prediction results to the system evaluator 20 so that inside system evaluator 20 a comparison for estimating quality of the prediction can be carried out. The comparison result is then fed back to the modulation signal converter 13.

In order to obtain prediction results in prediction system 2 direct indicators and indirect indicators are calculated and based on at least the indirect indicators the context based prediction is performed. Furthermore, based on the direct indicators and also based on the result of the context based prediction the physical prediction is performed.

The context-based prediction result and the physical prediction result are output by the prediction system 2 and as mentioned above supplied to the system evaluator 20.

In the above-mentioned example, a comparison between the context-based prediction result and the actual behavior of target vehicle A shows a mismatch. The determination result of the system evaluator 20 is then used for further prediction cycles by using the modulation signal converter 13, the output of which is fed to the prediction system 2 and thus, can be used in further prediction cycles. The modulation signal converter 13 is configured to obtain from the information output by the system evaluator 20 individual mismatch rates for false negative predictions and false positive predictions. A false positive prediction corresponds to the above given example (cut-in predicted but not observed), but of course it is also possible that in a European traffic situation for example the prediction result of the context-based prediction is "no cut-in of target vehicle A", but in fact the driver of vehicle A decided to cut-in.

An adaptation of the prediction inside the prediction system unit 2 is performed on the basis of a modulation signal 14 that is output by the modulation signal converter 13. For example, the modulation signal converter 13 outputs as a modulation signal a confidence value for the context-based prediction. Such confidence value is 1 when a mismatch rate that is below a predetermined threshold. For example, in case that the mismatch rate for false positive predictions is below 55%. If the mismatch rate exceeds such threshold, the confidence value for the context-based prediction that delivers a positive prediction result is reduced. On the other side, if the mismatch rate for false negative predictions exceeds a threshold that may be individually set or the same as for the false positive predictions, the confidence value for the negative prediction result will be increased.

The illustrated example uses a confidence value for the prediction results for the context-based prediction as a modulation signal. This is indicated in the enlarged, more detailed illustration of the prediction system unit 2 by the dashed arrow. With the confidence value, the output of the context-based prediction subunit 23 is corrected and such corrected context-based prediction result is then used for further steps of the prediction and in particular also as an input for the physical prediction step in the physical prediction subunit 24.

Another implementation for improving the system performance will be illustrated by at first explaining a problem of driver assistance systems without the present invention. In different areas of the world, the driving situations occurring on average are different. For example, the density of the traffic on Chinese highways may be different and thus, the angle at which a lane change is performed may be different from Europe. At first, the situation on a European highway is explained again, which is basically the situation as explained with respect to FIG. 2A, but at a later point in time. This can be recognized, because that target vehicle A already started changing the lane thereby following the trajectory predicted by the physical prediction. Thus, the actual trajectory of target vehicle A corresponds to the physical prediction result.

Figure 4:
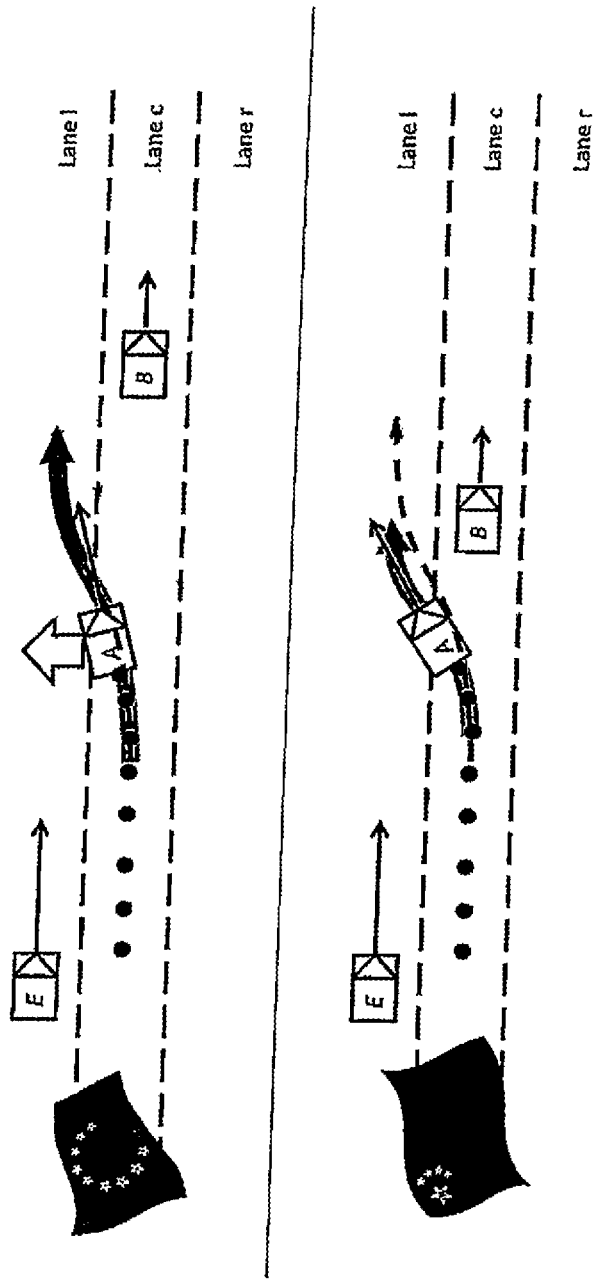
FIGS. 4A and 4B a second situation for explanation of an alternative for performing system performance improvement.

The situation is different in FIG. 4B. Here, the same parametric trajectory model, which is correct for a situation in Europe (FIG. 4A), is applied and thus, the predicted positions of target vehicle A over time follow the dashed arrow. But in fact and due to the lower speed that is usually driven in other traffic environments like for example, in China, the actual trajectory of target vehicle A deviates from the predicted trajectory, because the lane change is performed with steeper angle. This is indicated by the thick arrow. In that case the physical prediction result and the actual behavior of target vehicle A do not match. In order to improve a quality of the physical prediction, again the data 10 about the traffic environment is stored in memory 18 so that the actual trajectory of target vehicle A is known. The information about this trajectory is fed to the modulation signal converter 13. The modulation signal converter 13, based on the knowledge of the actual trajectories in case of a cut-in for example, can optimize the model parameters. Again, such optimization will be carried out preferably only in case that by system evaluator 20 a mismatch rate of more than a predetermined value can be recognized. Alternatively, the optimization of parameters can be conducted also when the mismatch rate which is one example for a measure of quality of the prediction, does not exceed such threshold. A mismatch is for example recognized if the deviation of the actual trajectory from the predicted trajectory exceeds a predetermined value.

The prediction system unit 2 is provided with an adapted parameter or parameter set defined in the modulation signal that is determined and output by the modulation signal converter 13. In the modulation signal converter 13, the optimization of the parameters that are used for the parametric trajectory model can be optimized either on the basis of all stored actual states such trajectories of a target vehicle A for a particular behavior or only a part of the event history.

In case that it is indicated by the system evaluator 20 that an optimization of the parameters is necessary, the modulation signal converter 13 can read in the respective trajectories of the target vehicle A from memory 18. In order to reduce the amount of data that needs to be processed it is possible to store only a predetermined number of last trajectories for a particular behavior in the memory 18. An alternative is to store such trajectories only for a certain period of time so that the number of trajectories that is used for the parameter optimization depends on the number of events per period of time. It is in particular preferred that the position history (data 10 in general) that is stored in memory is stored separately for all corrected predicted lane changes (true positives in general) or not predicted lane changes (false negatives in general) and incorrected predicted lane changes (false positives in general). Based on these position histories it is then possible to run a parameter optimization algorithm in the modulation signal converter 13. Examples for such algorithms are least-square error methods simulated an annealing, discrete gradient based models and evolutionary optimization. The parameter optimization can be performed online or offline in the modulation signal converter 13. The optimization is basically a comparison of predictions results that are calculated in the modulation signal converter 13 on the basis of different parameter sets with the actual trajectory of the target vehicle A so that the parameter set on which the best match prediction result is based can be used for further predictions in the prediction system unit 2. Thus, the parameter set as optimized in the modulation signal converter 13 is supplied to the prediction unit 2.

In the example that is illustrated in FIGS. 4A and 4B, it is a model slope that is a parameter for steepness of the lane change and in case that the lane change is performed as illustrated in FIG. 4B, a reduced model slope is transferred by the modulation signal to the prediction system unit 2.

Figure 5:
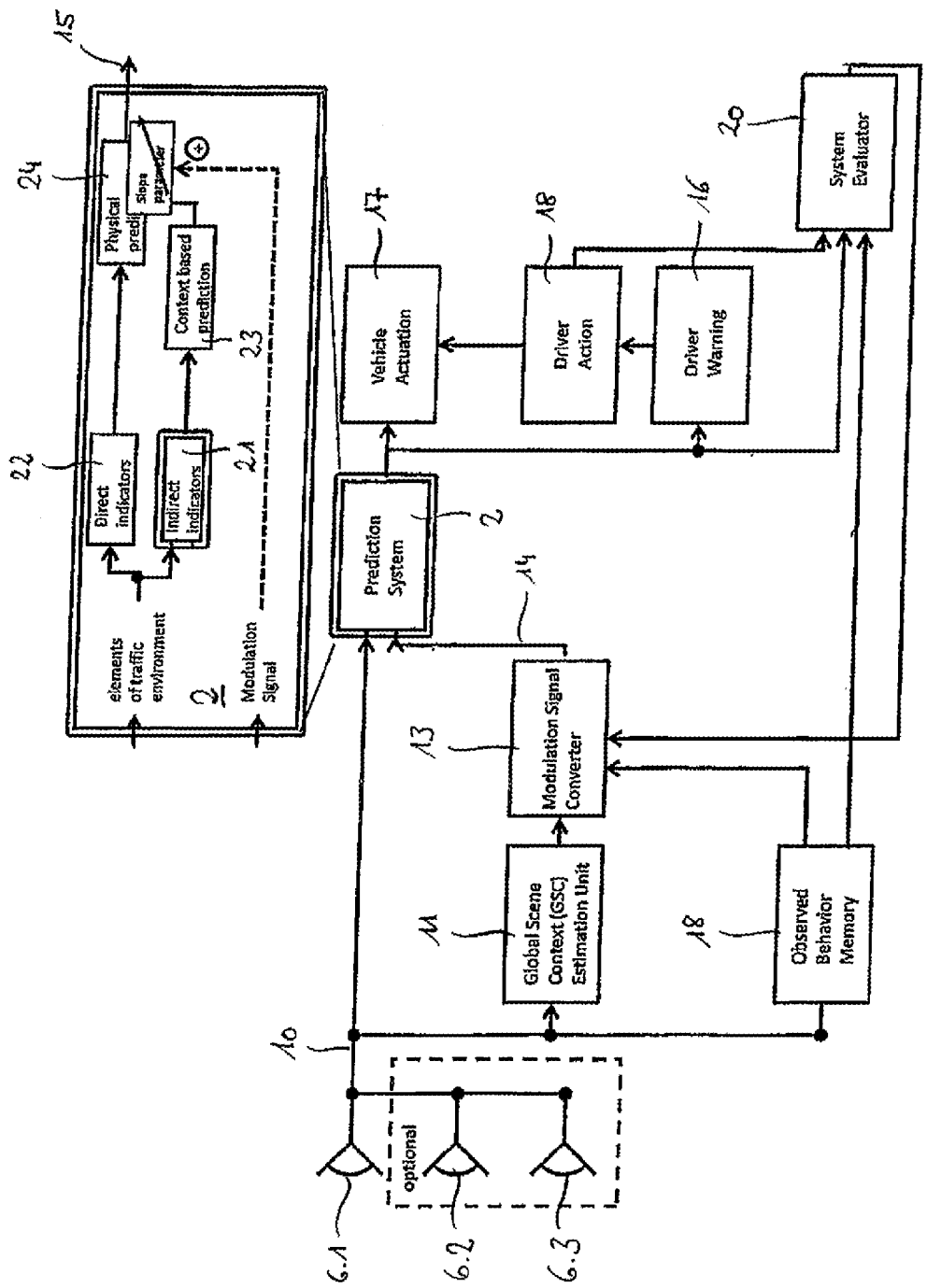
FIG. 5 a scheme for explaining the method according to the second situation.

Again in a detailed illustration of the prediction system unit 2 in FIG. 5 and basically corresponding to FIG. 3, it is indicated by the dashed line that the modulation signal including the slope parameter is supplied to the physical prediction subunit 24. Thus, in that case the context-based prediction is calculated unchanged. In addition to the context-based prediction result the slope parameter is supplied to the physical prediction subunit 24 as an input. The next prediction cycle that is carried out by the prediction system 2 is then based on the new slope parameter which is one of the parameters of the parametric trajectory model used in the physical prediction.

Figure 6:
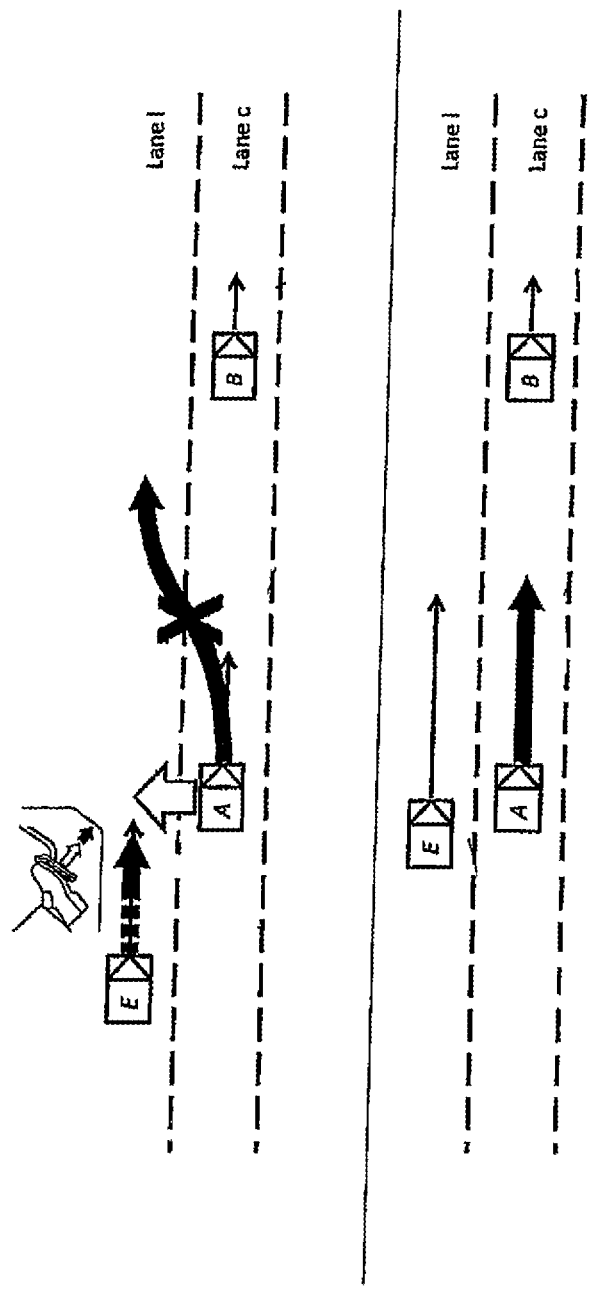
FIG. 6 a third situation for explaining improvement of the performance on the basis of a host vehicle driver's operation.

Another approach for optimizing the performance of a driver assistance system 1 will now be illustrated starting with the explanation of a situation in which a conventional driver assistance system may provide results to a driver that are unsatisfying. At first, in FIG. 6 in the upper part, there is described the situation at a first point in time. Similar to the situations that have been explained above, target vehicle A approaches its predecessor vehicle B since the current driving speed of vehicle B is lower than the driving speed of vehicle A. Although the driver assistance system predicts (context based prediction) the cut-in of target vehicle A and thus may automatically decelerate ego-vehicle E in the illustrated situation, the driver of the ego-vehicle E decides that he does not wish to let target vehicle A pass vehicle B in front of the ego-vehicle E.

Consequently, he operates the throttle to accelerate and therefore overrides the deceleration activation of the driver assistance system in case of an automated control and thus, closes the gap. The behavior that otherwise would have been carried out by the driver assistance system, namely the deceleration of ego-vehicle E, is thereby overwritten by a driver's decision. Previous proposals for driver assistance systems are not adapted in such a case. Thus, every time such a situation occurs anew, the driver of the ego-vehicle E will necessarily have to overrule the system 1 by operating the throttle. The result of overruling the actuation of the driver assistance system is illustrated in the lower part of FIG. 6. Here, ego-vehicle E now drives at a later point in time at a higher speed than at the initial point in time. Thus, the gap that initially was available for target vehicle A is no longer present and consequently the prediction system unit 2 will correctly recognize that cut-in of target vehicle A will not be performed any longer.

According to the present invention, the driver action is observed as an actual state of the ego-vehicle and thus, the system is capable of recognizing that contrary to the proposed or initiated deceleration of the host vehicle E (estimated future state) the driver prefers another behavior, namely to accelerate or at a least decides to drive at speed different from the target speed of the driver assistance system.

Figure 7:
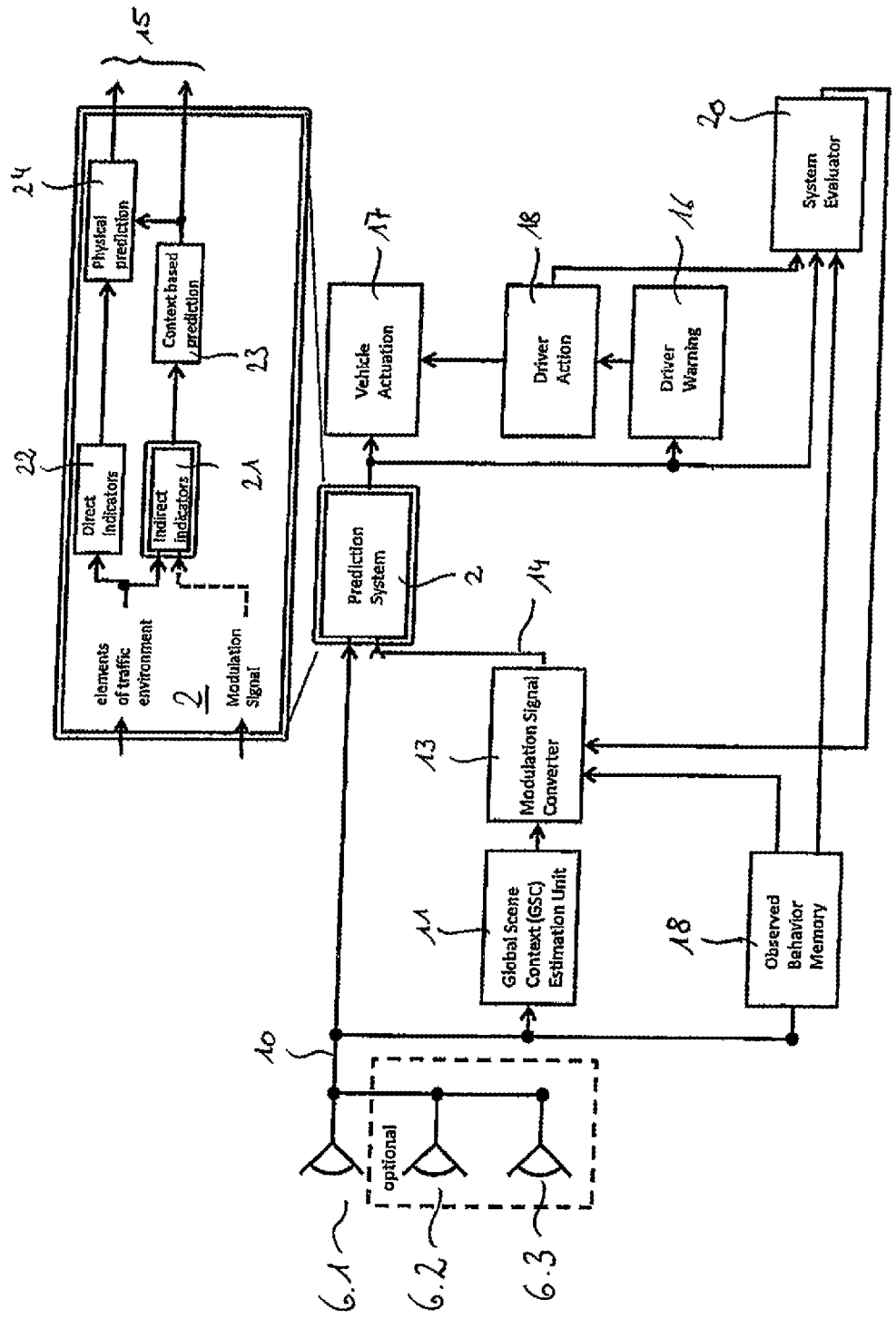
FIG. 7 a scheme for explanation of the inventive method in situation 3.

It is to be noted that such deceleration of the host vehicle E is based on the context-based prediction result only but not the physical prediction result. As before, the system evaluator unit 20 receives the results of the prediction system unit 2 and thus is aware of the context-based prediction result that the driver of the target vehicle A intends to cut-in. Since the driver action is observed and the result of the observation is also supplied to the system evaluator unit 20, the system evaluator 20 can recognize how often contrary to a suggested or assumed behavior the driver of the ego vehicle decides to perform another driving behavior. If the proposed or suggested behavior that is the consequence of the context-based prediction result for the target object is overruled for example 30%, the system evaluator 20 outputs an information signal which is supplied to the modulation signal converter 13. This information signal includes the information for the modulation signal converter 13 that the parameter that sets the conditions for context-based prediction needs adaptation. In the driver assistance system, as it is illustrated in FIG. 7, the modulation signal converter unit 13 receives information about an estimated global scene context as it was already explained earlier. Based on such global scene context, it is for example distinguished between mild traffic and dense traffic. Based on such global scene context, the modulation signal converter unit 13 generates scaling factors as a modulation signal which are transferred to the prediction system and as indicated in the detailed illustration of the prediction system unit 2 to the indirect indicator generation subunit. These scaling factors are now also used by the modulation signal converter 13 to improve the prediction performance on the basis of the information received from the system evaluator unit 20. Thus, within the modulation signal converter unit 13, it is determined which of the scaling factors that are available for weighting the indirect indicators for the context-based prediction in such a way that the context-based prediction result better fits to the desires of the individual driver.

For example, the scaling factors that are used in mild traffic cause a weighting of the indirect indicators in such a way that the probability for a cut-in of the target vehicle A is reduced for smaller gaps on the lane of the ego-vehicle. Thus, if initially the scaling factors are set to parameters corresponding to "normal traffic density", the modulation signal converter 13 will set in case that the driver regularly overrides the system's decision which is based on the context-based prediction result to "mild traffic". Future predictions will then be carried out on the basis of the scaling factors that cause a weighting of the indirect indicators according to the modulation signal "mild traffic". This results in a prediction of a cut-in only for very large gaps on the ego-vehicle lane l. As a consequence, for gap sizes in which for normal traffic conditions a cut-in would have been predicted, now no cut-in will be predicted and thus, the driver of the ego-vehicle will not be distracted and the system will not automatically decelerate because of the adapted prediction results. Thus, no intervention of the ego-vehicle's driver will be necessary in such situations in the future.

Figure 8:
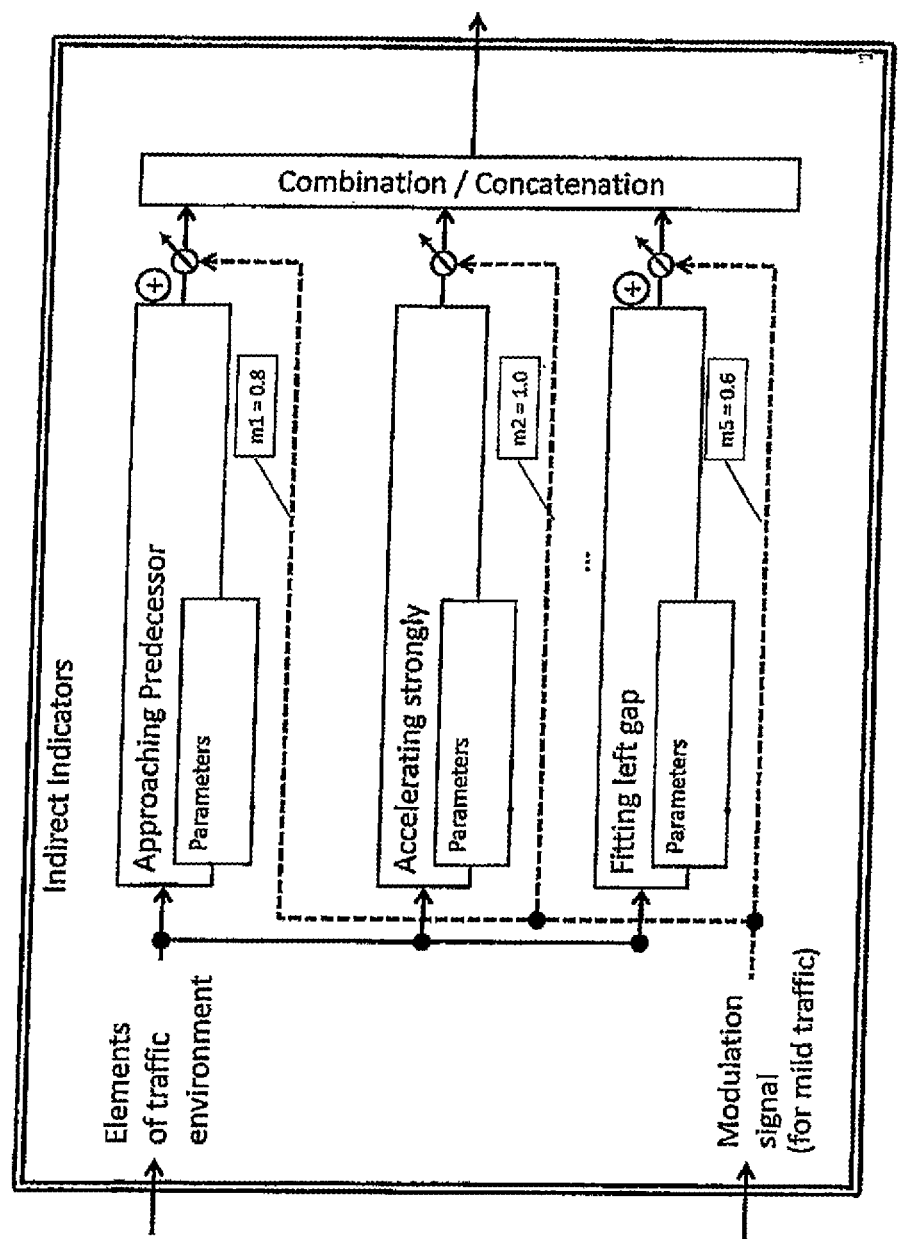
FIG. 8 a detail of the prediction system.

FIG. 8 illustrates the different possibilities how such adapted scaling factor received from the modulation signal converter unit 13 in the modulation signal affect, the indicators that are the basis for determining a cut-in. For example, the scaling factor or weighting coefficient for the indirect indicator "approaching predecessor" is set to 0.8, the weighting factor for the indicator "accelerating strongly" is set to 1.0 and the weighting factor for the indicator "fitting left gap" is set to 0.6. The further context-based prediction is then carried out on the basis of the weighted indicator values which are combined or concentrated and no further adaptation of the prediction procedure itself needs to be carried out.

It is to be noted that the examples explain the working principle of modulation signal converter 13 on the basis of preferred algorithms. But the different ways of modulating the prediction algorithm parameters and results are independent from the different options to generate a measure for quality of the prediction, e.g. a mismatch rate. The modulation signal output by modulation signal converter 13 may that use any of scaling of the prediction confidence or of the threshold applied to this confidence to trigger an action, changing a parameter set consisting of indicator variables for context based prediction and/or trajectories for physical prediction. On the other side system evaluator 20 may perform comparing observed behavior with predicted behavior by the context based prediction and/or with predicted behavior of the physical prediction or with driver behavior. Any of the modulation signal converter outputs may be based on any system evaluator output.

Further parameter sets can be chosen from a plurality of pre-stored parameter set as it is already described for "mild traffic", "normal traffic density" and the like. But an adaptation of a parameter set can also be achieved by amending parameter values starting from current parameters. This amendment may in particular be performed incrementally or continuously.

The invention claimed is:

1. A method for improving performance of a method for computationally predicting a future state of an object, the method comprising the steps of:
   acquiring data describing a traffic environment including a target object;
   performing at least one prediction for estimating a future state of the target object or an ego vehicle;
   generating a signal indicative of a prediction result describing the estimated future state of the target object or the ego vehicle;
   observing an actual state of the target object or the ego vehicle that corresponds to the estimated future state;
   estimating quality of the prediction by comparing the observed actual state and the estimated future state of the prediction result, and
   changing the prediction result or parameters of the prediction based on the estimated quality,
   wherein the observing comprises at least a behavior of the ego-vehicle driver or an operation performed by the ego vehicle driver,
   wherein the estimating comprises determining whether the behavior or the operation of the ego vehicle driver corresponds to the prediction result or if the operation or the behavior contradicts an action that would be suggested or controlled on the basis of the prediction result, and
   wherein the prediction result is used to perform at least one of a throttle control or a brake control of a vehicle.

2. The method according to claim 1, wherein the at least one prediction comprises a context based prediction.

3. The method according to claim 2, wherein based on the parameter set, an adaptation of the indirect indicators is performed which are used in the context based prediction.

4. The method according to claim 1, wherein the at least one prediction comprises a physical prediction.

5. The method according to claim 1, wherein the predicted and observed state is a behavior, quality is mismatch rate between predicted and observed state and that on the basis of the control signal a parameter set for the prediction is changed or a confidence value for a prediction result is weighted.

6. The method according to claim 5, wherein the confidence value is adapted in case that a mismatch rate between the observed actual state and the prediction result for a plurality of predictions exceeds a predetermined threshold.

7. The method according to claim 6, wherein the confidence value is decreased in case of a false positive prediction wherein in a false positive prediction a particular state is predicted to occur but is not observed.

8. The method according to claim 6, wherein the confidence value is increased in case of a false negative prediction wherein in a false negative prediction a particular state is predicted not to occur but is observed.

9. The method according to claim 5, wherein a separate mismatch rate is determined for false negative predictions and false positive predictions.

10. The method according to claim 9, wherein a new threshold for the optimized parameters is determined by an evaluation of the stored observed actual states.

11. The method according to claim 1, wherein on the basis of stored observed actual states a parameter optimization algorithm is run.

12. The method according to claim 11, wherein the observed actual states are stored only for a predetermined time period or only for a predetermined number of observations of states.

13. A driver assistance system; designed to be mounted on a host vehicle, the driver assistance system comprising:
   at least one memory comprising computer program code;
   at least one processor;
   wherein the at least one memory and the computer program code are configured, with the at least one processor, to cause the driver assistance system at least to:
      acquire data describing a traffic environment including a target object;
      perform at least one prediction for estimating a future state of the target object or an ego vehicle;
      generate a signal indicative of a prediction result describing the estimated future state of the target object or the ego vehicle;
      observe an actual state of the target object or the ego vehicle that corresponds to the estimated future state;
      estimate quality of the prediction by comparing the observed actual state and the estimated future state of the prediction result, and
      change the prediction result or parameters of the prediction based on the estimated quality,
      wherein the observing comprises at least a behavior of the ego-vehicle driver or an operation performed by the ego vehicle driver,
      wherein the estimating comprises determining whether the behavior or the operation of the ego vehicle driver corresponds to the prediction result or if the operation or the behavior contradicts an action that would be suggested or controlled on the basis of the prediction result, and
      wherein the prediction result is used to perform at least one of a throttle control or a brake control of a vehicle.

14. The driver assistance system according to claim 13, wherein the driver assistance system is an adaptive cruise control.

15. The driver assistance system according to claim 13, wherein the driver assistance system influences controls of the vehicle based on the output signal.

16. A computer program embodied on a non-transitory storage medium which stores a computer-readable program that, when running on a computer or loaded onto a computer, causes the computer to perform a data recording and reproducing method comprising the following steps:
   acquiring data describing a traffic environment including a target object;
   performing at least one prediction for estimating a future state of the target object or an ego vehicle;
   generating a signal indicative of a prediction result describing the estimated future state of the target object or the ego vehicle;
   observing an actual state of the target object or the ego vehicle that corresponds to the estimated future state;
   estimating quality of the prediction by comparing the observed actual state and the estimated future state of the prediction result, and
   changing the prediction result or parameters of the prediction based on the estimated quality, wherein the observing comprises at least a behavior of the ego-vehicle driver or an operation performed by the ego vehicle driver, wherein the estimating comprises determining whether the behavior or the operation of the ego vehicle driver corresponds to the prediction result or if the operation or the behavior contradicts an action that would be suggested or controlled on the basis of the prediction result, and wherein the prediction result is used to perform at least one of a throttle control or a brake control of a vehicle.

* * * * *